Dec 5, 1939.  H. R. PLATTS  2,182,303
CUTLERY CONSTRUCTION
Filed June 25, 1937
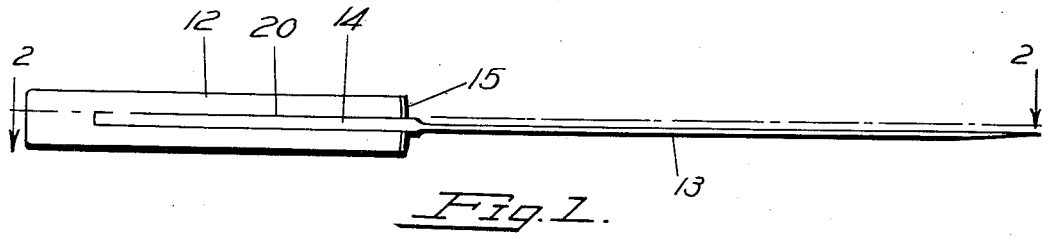
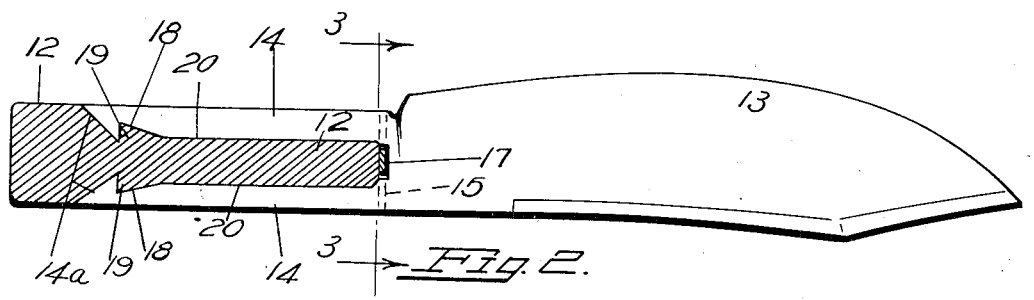
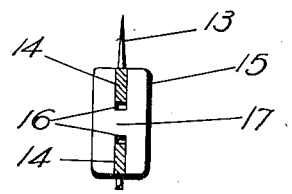
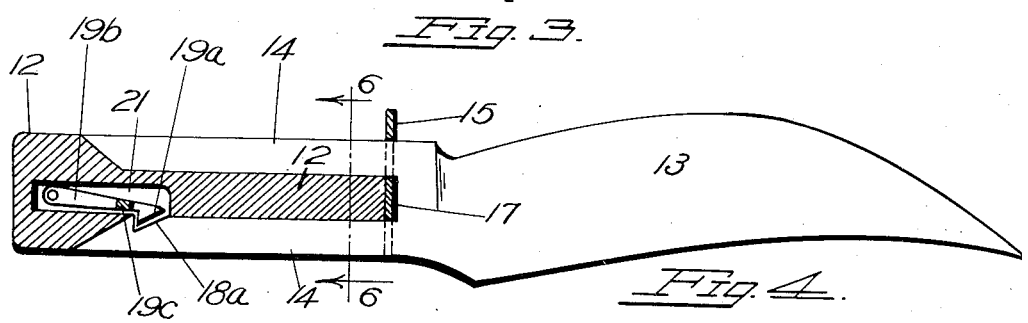
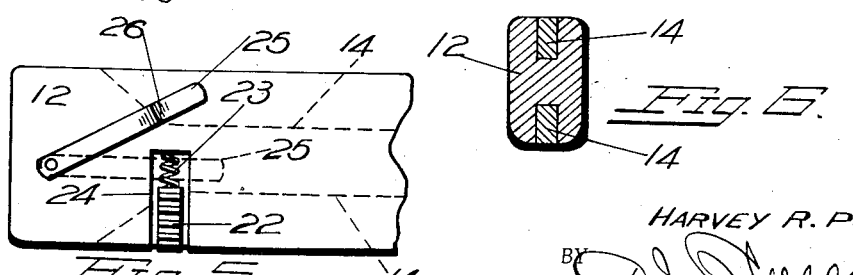
INVENTOR.
HARVEY R. PLATTS
BY
—ATTORNEY.

Patented Dec. 5, 1939

2,182,303

UNITED STATES PATENT OFFICE 2,182,303

CUTLERY CONSTRUCTION

Harvey R. Platts, Boulder, Colo.

Application June 25, 1937, Serial No. 150,347

6 Claims. (Cl. 30—342)

This invention relates to improvements in cutlery construction.

An object of the invention is to provide means for securing a handle to a blade or the like in a novel and simple manner.

A further object of the invention is to provide means whereby a blade can be inserted into a handle and secured therein in a single operation.

Another object is to provide a handle for cutlery and the like having a locking means to engage a blade element by a sliding movement of the handle.

A still further object is the provision of a handle for cutlery or the like, that may be securely attached to a blade element without the use of rivets.

Other objects reside in details of design and construction that effect an assembly requiring a minimum of time and material in the manufacturing of cutlery. The invention is more fully disclosed in the following description and in the drawing wherein like parts have been similarly designated and in which;

Figure 1 is an edge elevation of a butcher knife constructed according to this invention;

Figure 2 is a sectional view along line 2—2 of Figure 1;

Figure 3 is a cross sectional view on line 3—3 of Figure 2;

Figure 4 is a longitudinal sectional view of a knife made according to a modified form of the invention;

Figure 5 is a fragmentary plan view drawn on a larger scale, of the handle of a knife that is of similar construction to that shown in Figure 4; and Figure 6 is a cross section on line 6—6, Figure 4.

In the drawing reference character 12 denotes a handle member and 13 a blade element bifurcated at one end to provide spaced tines 14 embedded in the handle. A resilient bolster plate is shown at 15, having slots or apertures 16 to pass over the tines and a bridge 17 positioned between the tines and bearing against the blade element at the end of the bifurcation between the tines. The bolster plate is curved slightly as shown in Figure 1, to resiliently resist the insertion of the blade element into the handle and thereby prevent relative unwanted movement or slippage of the handle with reference to the blade, after the assembly is completed.

In the form of the invention illustrated in Figures 1, 2 and 3, each tine 14, has a detent-engaging notch 18 at its innermost edge, to engage the respective, similarly shaped, detents 19 that, in this form as illustrated, are integral with the handle 12. It is to be understood that the handle is grooved, as at 20, to admit the tines 14 to be inserted longitudinally thereinto and the tines are made of such material and dimensions as to spring outwardly as beveled ends 14a thereof pass the detents. When the tines are completely inserted along the grooves into the handle, they spring back into their normal position as shown, with the detents in the notches thereby locking the handle onto the blade. The curved bolster plate 15 is pressed against the end of the blade bifurcation, by the inner end of the handle, as the assembly is accomplished, so that a tight union of the handle and blade is further effected thereby. The size and shape of the grooves 20, correspond to the dimensions of the tines to assure a good fit. The tines are flush with the surface of the handle, to provide a smooth gripping surface.

In the construction shown in Figures 1, 2 and 3, the blade and the handle are irremovably joined since the tines 14 fit snugly in the grooves of the handle and completely fill the same. However, it will be understood that by inserting a tool between the beveled ends 14a of the tines and the corresponding end of the grooves, it would be possible to spring the tines apart whereby to remove the blade from the handle. This would, from a practical point of view, not be desirable, and if it were necessary to remove the blade from the handle as, for example, for the purpose of interchanging one blade with another, a construction such as shown in Figures 4 to 6, would be more effective.

In the form illustrated in Figures 4 and 5, the detent element 19a is on a pivoted arm 19b, in a recess 21 within the handle member. The detent element is connected by a short bar 19c to a thumb-piece 22 at the surface of the handle as illustrated in Figure 5. The detent assembly, in this form, is therefore movable and is urged into engagement with a notch 18a on one of the tines, by a compression spring 23 in an opening 24 in the handle. In this form, the tines of the blade element may be made relatively more rigid than in the first form, because the detent is resiliently mounted to admit its engaging tine.

A spring safety-clip 25 is pivotally mounted on the handle surface and is inwardly indented at 26 whereby, when it is rotated to its operative position as shown in dotted lines, it engages in the opening 24 over the spring 23 and between the inner end of the opening and the inner end of the thumb-piece 22. In this position the clip prevents inward movement of the thumb-piece which would release the blade from the detent. When it is desired to release and remove the blade, the spring clip can be raised slightly from the opening and rotated as shown.

The form of knife shown in Figures 4 and 5 is intended for sporting or hunting purposes. Other blades having similar tines may be interchanged in one handle of this type.

What I claim and desire to secure by Letters Patent is:

1. In cutlery construction, a handle element having notched grooves, a curved bolster of resilient material having spaced openings, and a blade element having resilient spaced tines provided with detents and adapted to slide through the openings in the bolster and to enter the grooves in the handle element to be retained therein by the locking of the detents in said notched grooves, the bolster bearing on the handle element and on the blade element between its tines.

2. In cutlery construction, a grooved handle element, a bolster having spaced openings, a blade element having spaced tines adapted to pass through the openings in the bolster and to enter the grooves of the handle element, the bolster bearing on the handle element and on the blade element between its tines, and means to hold the tines in the handle element.

3. In cutlery construction, a handle element having notched grooves, a bolster having spaced openings, and a blade element having spaced tines provided with detents and adapted to slide through the openings in the bolster and to enter the grooves in the handle element to be retained therein by the locking of the detents in said notched grooves, the bolster bearing on said handle element.

4. In cutlery construction, a handle element having grooves, a blade element having tines adapted to enter said grooves, one of the tines having a notch, a movable detent in the handle element engageable in said notch to hold the blade tine in the handle element, means on said detent accessible from the exterior of the handle element for moving the detent to release the blade tine, and a spring lock for the said means to prevent its accidental movement.

5. In cutlery construction, a handle element having grooves, a blade element having tines adapted to enter said grooves, one of the tines having a notch, a movable detent in the handle element engageable in said notch to hold the blade tine in the handle element, means on said detent accessible from the exterior of the handle element for moving the detent to release the blade tine, and a lock for the said means to prevent its accidental movement.

6. In cutlery construction, a handle element having grooves, a bolster having spaced openings, a blade element having spaced tines adapted to slide through the openings in the bolster and to enter the grooves in the handle element, the bolster bearing on said handle element, and means for retaining the tines in the handle element.

HARVEY R. PLATTS.